Patented Dec. 25, 1923.

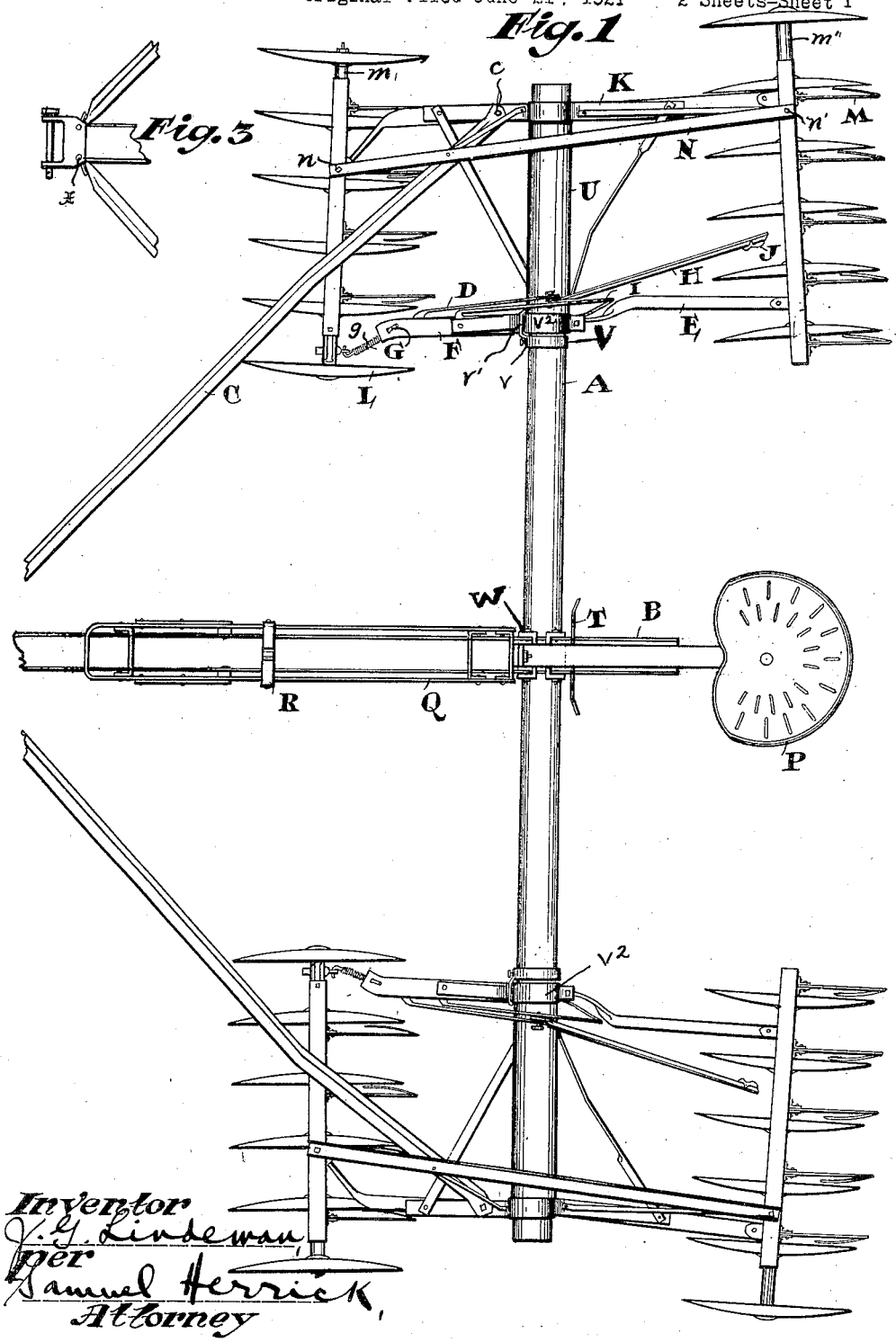

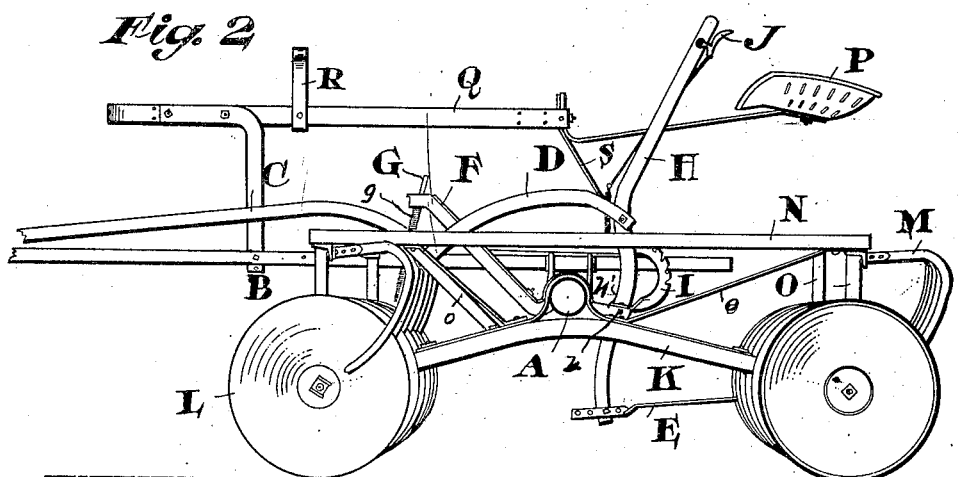

1,478,830

UNITED STATES PATENT OFFICE.

JESSE G. LINDEMAN, OF YAKIMA, WASHINGTON.

ORCHARD DISK OR HARROW.

Application filed June 21, 1921, Serial No. 479,274. Renewed June 27, 1923.

*To all whom it may concern:*

Be it known that I, JESSE G. LINDEMAN, a citizen of the United States of America, residing at Yakima, in the county of Yakima and State of Washington, have invented certain new and useful Improvements in Orchard Disks or Harrows, of which the following is a specification.

This invention relates to an agricultural implement in the nature of a disk or harrow and it has for its object to provide an improved device of this nature particularly adapted for use in orchard work, though it will also be found useful in other relations.

The invention contemplates the provision of an orchard disk or harrow comprising a main supporting element and gangs of disks adjustable toward and from each other along said main supporting element to thereby dispose them in position where they will run close to the trunks of trees in an orchard or whereby they may be adjusted toward each other to cultivate the space between the trees.

The invention further contemplates the provision of a device of the character above set forth arranged in such manner that the adjustment of the gangs of disks toward and from each other may be effected under the power of the tractor or teams by which the structure is being drawn.

Further objects and advantages of the invention will be set forth in the detailed description which follows.

In the accompanying drawings:

Fig. 1 is a plan view of an orchard disk or cultivator constructed in accordance with the invention;

Fig. 2 is a side elevation thereof; and

Fig. 3 is a detail view of a tractor hitch hereinafter described.

Like numerals designate corresponding parts in all of the figures of the drawings.

In the drawings A designates a rod or pipe extending transversely of the line of travel of the machine as a whole and having slidably disposed thereon, additional pipe sections or sleeves U. Thus these sleeves and the gangs of disks carried thereby may be slidably adjusted toward and from each other along the rod or pipe A. The gangs of disks, as a whole, are held in the positions to which they may be adjusted by means of collars V that are adapted to be bound to the pipe A by means of set screws $v$, which collars are provided with tongues $v^1$ which engage over clamp-like collars $v^2$ of the sleeves U. At the outer sides of the gangs of disks, frame members K are supported from the sleeves U and the front and rear disk axles $m$, $m'$ are pivoted to the front and rear ends of these frame members K at $n$, $n'$ respectively. Longitudinal braces N and vertical posts O together with inclined braces $o$ lend the necessary stiffness and rigidity to the structure. Draw rods C are pivoted at $c$ to the frame members K and are pivoted at their forward ends at $x$ to a tractor hitch connection X. This tractor hitch connection carries a rearwardly extending channel iron B, the rear portion of which slides through a bracket W secured centrally upon the pipe A. By virtue of this arrangement the power of the tractor or of the draft animals may be employed to move the gangs of disks bodily toward or from each other. This is effected by setting the disks L at the proper angles to cause them to tend to move the gangs of disks bodily, laterally in the direction desired and then moving the machine, as a whole, over the ground in the proper direction. In other words, if it be desired to move the gangs of disks outwardly so that they will work close up to the trunks of the trees in an orchard row, the set screws are loosened in the collars V and the disks are set in such manner that their rear edges point outwardly. By then backing the tractor to back the machine as a whole, the tendency of the disks to roll away from the center together with the outward pressure of the draw bars C as the channel B slides rearwardly will serve to automatically move the gangs of disks outwardly upon the pipe A. When the gangs of disks have been brought to the desired position the set screws $v$ are tightened to hold them in such adjusted position.

Upon the other hand if it be desired to move the gangs of disks toward each other so that the inner disks L are brought into proximity to each other this can be effected by loosening the set screws and driving the tractor ahead, the angles of the disks being as before stated. The action of the draw bars C then tends to draw the gangs of disks inwardly and this action is further promoted by the tendency of the disks to move toward the center.

For effecting the angling of the disks, levers H are pivoted at $h$ to brackets $h'$ and these levers are connected by links D and E with the front and rear disk axles. The levers H are controlled in a usual and well known manner by latches J and segments I. Disk cleaners M of the usual and well known construction have their terminal ends disposed in position to dislodge dirt from the disks. Brackets F supported from their pipe A have their forward ends disposed adjacent the front disk axles and rods G projecting through the forward ends of these brackets are connected to the front axles. Springs g disposed upon these rods provide a yielding connection between the disks, axles and the remainder of the structure. The purpose of this is to maintain a pressure on the inside end of the front disks. The elements Q, R and S are part of a special tractor hitch adapted to bring the disks shown into operative relation to a particular make of tractor. These parts form no particular part of the invention, since it is manifest that many ways may be employed for connecting the apparatus to the tractor. In the present form of the invention the seat P is shown as being supported from the parts Q and S, but it is manifest that this seat may be supported in any desired way without departure from the invention.

Having described my invention what I claim is:

1. A disk of the character described, comprising a supporting element extending transversely to the line of travel, and a pair of gangs of disks, one upon each side of the center of the line of travel and bodily movable as a unit and from each other and independently of the angle at which said disks are set in combination with draft elements connected to the gangs of disks at such angles as to move said gangs of disks toward or from each other under the forward or backward movement of the source of power by which the machine is drawn.

2. A device of the character described comprising a supporting element disposed transversely to the line of travel, a pair of gangs of disks slidably disposed thereon and each of which comprises a supporting frame, means for setting the disks of a gang at varying angles with respect to their frame and means for binding said gangs of disks in varying positions of adjustments along said supporting elements, the movement of said gangs of disks being independent of changes in the angles of said disks with respect to the supporting element in combination with draw bars connected to the respective gangs of disks and to a hitching element.

3. A device of the character described comprising a supporting element disposed transversely to the line of travel, a pair of gangs of disks slidably disposed thereon and each of which comprises a supporting frame, means for setting the disks of a gang at varying angles with respect to their frame and means for binding said gangs of disks in varying positions of adjustments along said supporting elements the movement of said gangs of disks being independent of changes in the angles of said disks with respect to the supporting element in combination with a hitching element, a pair of draw bars pivotally connected to said hitching element at their forward ends and connected at their rear ends to the gangs of disks, respectively, and a longitudinally movable member to which said hitching element is connected and which longitudinally movable member is slidably supported from the supporting element.

4. A device of the character described comprising a transversely extending supporting member, a pair of frames thereon, one upon each side of the center thereof, disk axles at the front and rear end of each of said frames, disks upon each of said axles, manually operable levers, connections for simultaneously shifting the axles upon each frame under the action of said lever, a draft tongue slidable with respect to the supporting member, a hitching element and draw bars extending between said hitching element and said frames and pivoted to each of them as and for the purposes set forth.

In testimony whereof I affix my signature in the presence of two witnesses.

JESSE G. LINDEMAN.

Witnesses:
HELEN HAZARD,
BEATRICE ARMSTRONG.